United States Patent
Hoffmann

(10) Patent No.: US 10,221,983 B2
(45) Date of Patent: Mar. 5, 2019

(54) SUBSEA PIPE-IN-PIPE STRUCTURES

(71) Applicant: Acergy France SAS, Suresnes (FR)

(72) Inventor: Philippe Benoit Jacques Hoffmann, Paris (FR)

(73) Assignee: Acergy France SAS, Suresnes (FR)

( * ) Notice: Subject to any disclaimer, the term of this patent is extended or adjusted under 35 U.S.C. 154(b) by 0 days.

(21) Appl. No.: 15/551,271

(22) PCT Filed: Feb. 11, 2016

(86) PCT No.: PCT/IB2016/000342
§ 371 (c)(1),
(2) Date: Aug. 15, 2017

(87) PCT Pub. No.: WO2016/132230
PCT Pub. Date: Aug. 25, 2016

(65) Prior Publication Data
US 2018/0031164 A1    Feb. 1, 2018

(30) Foreign Application Priority Data

Feb. 16, 2015   (GB) .................................. 1502581.0

(51) Int. Cl.
| | |
|---|---|
| *F16L 53/37* | (2018.01) |
| *F16L 59/14* | (2006.01) |
| *F16L 9/12* | (2006.01) |
| *F16L 9/18* | (2006.01) |
| *E21B 17/00* | (2006.01) |
| *E21B 36/00* | (2006.01) |

(Continued)

(52) U.S. Cl.
CPC .............. *F16L 53/37* (2018.01); *E21B 17/00* (2013.01); *E21B 36/003* (2013.01);
(Continued)

(58) Field of Classification Search
CPC ......... F16L 53/37; F16L 53/007; F16L 9/121; F16L 9/125; F16L 9/19; F16L 59/065; E21B 17/00; E21B 36/003; E21B 36/005
(Continued)

(56) References Cited

U.S. PATENT DOCUMENTS

| | | |
|---|---|---|
| 6,116,290 A | 9/2000 | Ohm et al. |
| 6,145,547 A | 11/2000 | Villatte |

(Continued)

FOREIGN PATENT DOCUMENTS

| | | |
|---|---|---|
| EP | 0 990 101 | 9/1998 |
| EP | 2 558 761 | 10/2011 |

(Continued)

OTHER PUBLICATIONS

API Specification 5L, "Specification for Line Pipe," American Petroleum Institute, Dec. 2012.

(Continued)

*Primary Examiner* — Craig Schneider
*Assistant Examiner* — David Deal
(74) *Attorney, Agent, or Firm* — Levy & Grandinetti

(57) ABSTRACT

A rigid pipe-in-pipe structure for subsea transportation of fluids includes inner and outer pipes defining a thermally-isolating annulus between them. Thermal insulation material is disposed in the annulus. The outer pipe is of metal, preferably carbon steel. The inner pipe is a polymeric composite structure of bonded layers including a first, radially outer tubular polymeric electrically insulating layer, which can be of pure polymer, surrounding a second, composite layer including carbon fibers, preferably continuous fibers, embedded in a polymer matrix. Conveniently the second layer is a heating layer in which the carbon fibers conduct electricity to heat the inner pipe. The inner pipe can also comprise a radially inner tubular polymer layer within the second composite layer.

24 Claims, 3 Drawing Sheets

Figure 1:
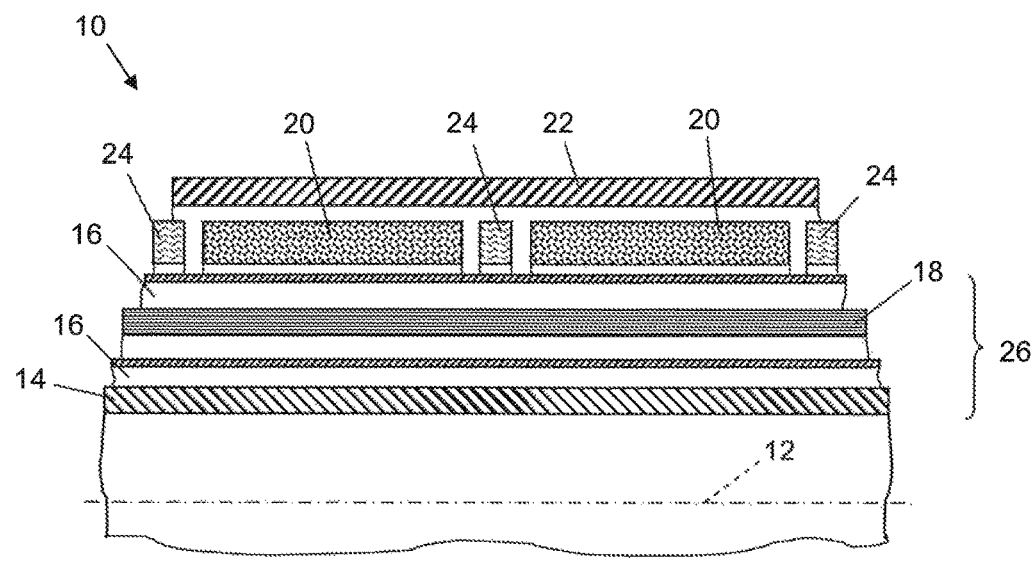

(51) Int. Cl.
*F16L 9/19* (2006.01)
*F16L 59/065* (2006.01)

(52) U.S. Cl.
CPC ............ *E21B 36/005* (2013.01); *F16L 9/121* (2013.01); *F16L 9/125* (2013.01); *F16L 9/18* (2013.01); *F16L 9/19* (2013.01); *F16L 59/143* (2013.01); *F16L 59/065* (2013.01)

(58) Field of Classification Search
USPC .................................................. 138/33, 114
See application file for complete search history.

(56) References Cited

U.S. PATENT DOCUMENTS

2013/0028580 A1    1/2013   Bigex et al.
2013/0108250 A1    5/2013   Bigex et al.

FOREIGN PATENT DOCUMENTS

| GB | 2492883 | 1/2013 |
|---|---|---|
| WO | WO 2012/023850 | 2/2012 |
| WO | WO 2012/072991 | 6/2012 |
| WO | WO 2014/029644 | 2/2014 |

OTHER PUBLICATIONS

API Specification 17J, "Specification for Unbonded Flexible Pipe," American Petroleum Institute, May 2014.
API Recommended Practice 17B, "Recommended Practice for Flexible Pipe," American Petroleum Institute, May 2014.
API Recommended Practice 1111, "Design, Construction, Operation, and Maintenance of Offshore Hydrocarbon Pipelines," American Petroleum Institute, Sep. 2015.

SUBSEA PIPE-IN-PIPE STRUCTURES

This invention relates to rigid pipelines of pipe-in-pipe ('PIP') construction that are suitable for subsea applications as used in offshore oil and gas production.

Subsea pipelines are used as 'tie-backs' to transport crude oil and/or natural gas from a subsea wellhead across the seabed on the way to the surface. Typically, in offshore locations, the oil and gas flows up a riser from the seabed to the surface to undergo treatment and temporary storage at a surface installation.

Conventionally, pipelines for transporting oil and gas underwater are fabricated or assembled from steel pipe joints attached end-to-end, for example by welding. This is the most common example of what is known in the art as a rigid pipeline. The steel is isolated from seawater by an anti-corrosion coating, which may be of plastics or concrete. A coating around the pipe may also be thermally insulating to contribute to thermal management of the fluids flowing within.

Oil and gas are present in subterranean formations at elevated temperature and pressure, which may be increased by the injection of fluids such as steam. On production of the oil or gas, the produced fluid emerges from the wellhead and enters a subsea pipeline in a multi-phase state.

During subsequent transportation along the pipeline, the temperature and pressure of the produced fluid have to be kept high enough to ensure a sufficient flow rate across the seabed and up the riser. In particular, various measures are taken to ensure that the internal temperature of the pipeline remains high, typically above 65° C. and in some cases above 200° C., despite thermal exchange with seawater which, for example, is around 4° C. below 500 m depth.

Low temperature increases the viscosity of the produced fluid and promotes precipitation of solid-phase materials, namely waxes and asphaltenes in crude oil and hydrates in natural gas. Such solid-phase materials tend to deposit on the inner wall of the pipeline and may eventually cause plugs, which will interrupt production. Aside from the high cost of lost production, plugs are difficult and expensive to remove and can even sever the pipeline.

In addition, an oil or gas field must occasionally be shut down for maintenance. During shut-down, production is stopped and so no hot fluid flows through the pipeline. Consequently, to avoid clogging by solid-phase materials, mitigating fluid such as methanol or diesel oil is injected into the pipeline during shut-down. When production restarts, temperature within the pipeline must be increased quickly so that no plugs will form.

It is important to maintain thermal management continuously along the length of a pipeline. Otherwise, 'cold spots' will arise, which increase the likelihood of plugs forming at those locations. The challenges of thermal management increase as subsea pipelines become longer. In this respect, there is a trend toward longer tie-backs as oil and gas reserves are being exploited in increasingly challenging locations.

In addition to ensuring effective thermal management, subsea pipelines must meet several other technical challenges simultaneously. They must be installable by existing installation vessels and thereafter must remain reliable for many years of service while allowing a sufficient flow rate of produced fluid. They must withstand mechanical loads during installation and afterwards in situ on the seabed, where they must withstand hydrostatic pressure exerted by the surrounding seawater and also the high temperature and pressure of the produced fluid, especially near the wellhead. Installed pipelines must also withstand mechanical loads including those induced by thermal expansion and contraction as well as by friction with the seabed, while ensuring fluid-tight interfaces with other subsea equipment. In use, installed pipelines must also resist external corrosion from seawater and internal corrosion from the produced fluid.

As many of these design constraints are incompatible, trade-offs have to be made. For example, as water depth increases, hydrostatic pressure increases by nominally 1 bar for every 10 m depth, while seawater temperature decreases until it stabilises at around 4° C. below 500 m depth. Simultaneously, the length and hence the weight of the pipeline catenary suspended between the installation vessel and the seabed increases, meaning that thermal management has to be more efficient and that the installation vessel has to be more capable.

These conflicting challenges have led to the development of various alternatives to conventional rigid and flexible pipelines, for example:

for small diameters, reinforced polymer pipelines have been adopted, in particular fibre-reinforced pipelines and pipelines of composite material such as in WO 2012/072991, which teaches a composite pipeline comprising a matrix containing embedded fibres that may have variable properties along its length;

lined pipes, in particular plastics-lined pipes and pipes lined with a corrosion-resistant alloy, for example as described in EP 0990101;

bundled pipelines; and

PiP structures comprising a fluid-carrying steel inner pipe positioned concentrically within a steel outer pipe, for example as disclosed in U.S. Pat. No. 6,145,547.

In PiP structures, the inner and outer pipes are spaced from each other to define a thermally-insulating annulus between them. Typically, thermally-insulating material is disposed in the annulus; it is also possible to draw down a partial vacuum in the annulus to reduce transmission of heat through the annulus. In these ways, the annulus provides high-performance thermal insulation in a passive approach to thermal management. The double-walled construction also enhances mechanical strength and leak protection.

PiP pipelines may be fabricated offshore on, and laid from, a pipelaying vessel using J-lay or S-lay techniques. PiP pipelines may also be laid in reel-lay operations, in which the pipeline is prefabricated in long stalks at a coastal spoolbase that a reel-lay vessel visits periodically for loading. At the spoolbase, the stalks are joined end-to-end as the resulting pipeline is spooled onto a reel carried by the vessel.

Spooling imparts plastic deformation to the pipeline. During subsequent pipelaying at sea, the pipeline is unspooled from the reel and straightened to recover the plastic deformation. A drawback of steel PiP for reel-lay applications is that both the inner and outer steel pipes are deformed plastically during spooling, but only the outer pipe can be straightened properly after unspooling.

Another drawback of steel PiP is its weight: it is so heavy that it is difficult to install where the water depth exceeds 2000 m. In this respect, the outer pipe must bear longitudinal tension loads including at least some of the weight of the inner pipe and the surrounding insulation as the pipe string hangs from a hang-off mechanism or tensioner on the installation vessel. It will be clear that the inner pipe cannot be engaged directly with a hang-off mechanism or gripped by a tensioner.

An aligner on the installation vessel may partially support the combined weight of the inner pipe and the insulation that surrounds the inner pipe within the annulus. However, the effective weight of the inner pipe and the surrounding insulation is very substantial, particularly as it arises from their weight in air, which is higher than their apparent weight would be if they were suspended in water like the outer pipe. This places a high load on the aligner, which requires the structure supporting the aligner to have great rigidity and load capacity. Unhelpfully, this adds weight at an elevated position on a laying tower of the installation vessel, which negatively impacts the stability of the vessel for a given size of hull. Self-weight also exerts a substantial compressive stress on the inner pipe near the sag bend, where the catenary curves onto the seabed at a touchdown point.

Electrically trace-heated PiP (ETHP) adds active thermal management to a PiP structure to manage the temperature of produced fluids more effectively. The trace heating system typically employs resistive electrical wires running along, and in thermal contact with, the outer surface of the inner pipe. Heat produced by passing an electric current along the wires is conducted through the pipe wall to the produced fluid flowing within. GB 2492883 and WO 2014/029644 disclose typical electrically trace-heated PiP flowline sections. However, these proposals require specific arrangements of heating cables that are not easy to manufacture and that are therefore expensive. They also suffer from the weight of all-steel pipe construction.

Hybrid or composite PiP structures are known in which a steel inner pipe transports a fluid and an outer pipe of composites or plastics defines the annulus and protects the structure from seawater. This type of pipe is used to transport cryogenic fluids such as liquefied gas.

Other hybrid or composite PiP structures are known in which an inner pipe of composites or plastics transports the fluid and a steel outer pipe defines the annulus and protects the structure from seawater. For example, WO 2012/023850 discloses a steel outer pipe and a plastics inner pipe. This arrangement is limited by the low mechanical strength of the plastics inner pipe: spacers between the inner and outer pipes are needed to keep the inner pipe centred within the outer pipe and to spread radial loads. Similarly, in U.S. Pat. No. 6,116,290, an inner plastics pipe is ribbed so that the ribs act as spacers. However, spacers may form a thermal bridge between the inner and outer pipes that will decrease the thermal performance of the assembly. Additionally, it is difficult to improve the thermal performance of such hybrid PiP structures by adding active thermal management, because the concentrated localised heat of heating elements such as wires could melt a plastics inner pipe.

EP 2558761 relates to a product offered by Total SA under the trade mark 'Energised Composite Solution' or 'ECS'. The PiP structure proposed in EP 2558761 is a composite structure that includes at least one layer component made of a composite material. The inner and outer pipes may be of steel or other materials, including composites.

Composites are proposed for the inner and outer pipes in EP 2558761 but steel has been adopted for those pipes in reality, in the form in which the ECS product is currently marketed. FIG. 1 represents the resulting composite structure 10 in exploded form, omitting details such as electrical connections for clarity. The various components of the structure 10 are rotationally symmetrical around a central longitudinal axis 12.

In EP 2558761, an inner, fluid-carrying pipe 14 has an outer electrically-insulating surface. The inner pipe 14 can be of a plastics material that is inherently electrically insulating on its outer surface, or of steel wrapped with an electrically-insulating layer to define an electrically-insulating outer surface. In practice, a steel inner pipe 14 wrapped with an electrically-insulating composite layer 16 of glass-reinforced polymer is used in embodiments of ECS as currently marketed.

A heating layer 18 is wrapped around the inner pipe 14, outside any electrically-insulating layer 16 that may also be wrapped around the inner pipe 14. The heating layer 18 is of carbon-reinforced polymer composite, comprising carbon fibres embedded in a polymer matrix of, for example, polyamide. A layer of thermal insulation 20 such as polyurethane foam is placed or injected around the heating layer 18.

A tubular casing in the form of an outer pipe 22 is spaced from the inner pipe 14 by spacers 24 to define an insulating annulus between the inner and outer pipes 14, 22. The spacers 24 are of a reinforcing filler embedded in a polymer material. In addition to the spacers 24, the annulus contains the heating layer 18, the thermal insulation layer 20 and any additional electrically-insulating layers 16. The outer pipe 22 has to be strong enough to withstand hydrostatic pressure at great depth, for example in excess of 100 bar at depths of greater than 1000 m.

In principle, the outer pipe 22 in EP 2558761 is preferably of a composite material, namely a carbon-reinforced polymer composite. However, steel is mentioned as an alternative material for the outer pipe 22. Again, in practice, a steel outer pipe 22 is used in embodiments of ECS as currently marketed.

For a composite heated PiP structure with a steel outer pipe 22—such as is encompassed by EP 2558761 and marketed as ECS—to work, the outside of the heating layer 18 must be electrically insulated from the outer pipe 22. Thus, either another electrically-insulating layer 16—for example another composite layer 16 of glass-reinforced polymer—must be interposed between the heating layer 18 and the thermal insulation 20 and spacers 24, or the thermal insulation 20 and spacers 24 must themselves be electrically insulating.

It will be evident that practical embodiments of the solution proposed in EP 2558761 are complex: the inner structure 26 comprising the inner pipe 14, the heating layer 18 and the necessary layers of electrical insulation 16 is a sandwich of non-homogeneous layers that cannot easily be bonded together. Manufacturing such an inner structure 26 to withstand bending and other stresses of installation and use may be difficult and expensive. Additionally, the spacers 24 may interfere with the function of the heating layer 18 and create a direct thermal bridge between the heating layer 18 and the outer pipe 22.

Thus, there remains a need for a lightweight, easy to manufacture, substantially rigid PiP structure, preferably with active thermal management that allows heat to be added to the produced fluid. Consequently, the invention proposes a further alternative to rigid and flexible pipelines for deep-water use, namely a PiP structure that is mechanically resistant, chemically resistant, lightweight, easy to manufacture and to install by conventional means, and cost-effective.

Against this background, the invention resides in a rigid PiP structure for subsea transportation of fluids. The structure comprises inner and outer pipes in spaced concentric relation to define a thermally-isolating annulus between them. Thermal insulation material is disposed in the annulus such that a gap is left in the annulus between the insulation material and the outer pipe.

In accordance with the invention, the outer pipe is of metal, preferably carbon steel, suitably being an assembly of at least two steel pipes that are butt-welded end-to-end. The inner pipe is a polymeric composite structure of bonded layers, comprising a first, radially outer tubular polymeric electrically insulating layer, which may be of pure polymer, surrounding a second, composite layer that preferably comprises carbon fibres, more preferably long and continuous carbon fibres, embedded in a polymer matrix. Such a structure is known in the art as a single-wall composite pipe structure.

The thickness of the outer layer of the inner pipe varies along its length such that the inner pipe comprises a series of longitudinally-spaced formations formed integrally with the outer layer of the inner pipe and protruding radially outwardly from the outer layer.

Conveniently the second, composite layer is a heating layer. Thus, carbon fibres embedded in the polymer matrix of a composite heating layer can conduct electricity to heat the inner pipe and therefore the fluid carried by it. This construction avoids the need to place multiple electrical wires around the inner pipe, as is done in conventional heated PiP structures. The carbon fibres of the composite layer are suitably connected to an electrical power supply at one or more ends of the PiP structure.

The first, electrically insulating layer helps to isolate the carbon fibres of the second layer electrically from the metal of the outer pipe. Even when low pressure is applied within the annulus, there will be no potential discharge as can occur in known heated PiP structures.

Advantageously, the inner pipe also comprises a third bonded layer, namely a radially inner tubular polymer layer within the second composite layer. The third layer is preferably an electrically insulating layer, suitably formed of pure polymer. The inner layer conducts heat from the carbon fibres to the fluid but electrically isolates the carbon fibres from the fluid and has a smooth inner surface to assure flow within the PiP structure.

The layers of the inner pipe may be bonded to each other by adhesion, for example via an intermediate adhesive layer, or preferably by fusing of thermoplastic polymers, for example via a welded interface at which abutting layers melt, soften and/or intermix.

The polymers of the first, second and optional third layers may be thermosets or thermoplastics. For compatibility and structural integrity, it is preferred that all of the layers comprise thermoset polymers or that all of the layers comprise thermoplastic polymers. Thermoplastic polymers are preferred as they enable melt-bonding between the layers. It is further preferred that the polymers of all of the layers, whether thermosets or thermoplastics, are of the same type. Such polymers are advantageously identical or at least structurally compatible for the purpose of bonding.

References in this specification to polymer or pure polymer allow for the addition of minor amounts of typical non-polymeric additives or constituents such as fillers.

The polymers of the first, second and optional third layers may additionally serve as a matrix for other reinforcing fibres such as glass fibres, aramid fibres and/or polyolefin base fibres such as a fibre sold by DSM Dyneeva B.V. under the registered trade mark 'Dyneema'. Such other fibres are not electrically conductive and need not be long or continuous; they may, for example, be short, chopped fibres.

The outer diameter of the inner pipe need not be substantially constant. For example, the outer layer of the inner pipe may comprise local overbuilt protruding formations such as integrally-formed radially-projecting formations protruding from the radially outer side of the inner pipe. Such formations are suitably made of a material having good thermal and electrical insulation properties and good mechanical properties. An example is pure or reinforced polymer, which is preferably of the same type as, or identical to, the polymer or reinforced polymer of the underlying outer layer of the inner pipe.

The protruding formations are spaced longitudinally along the inner pipe for axial location of the insulation material that surrounds the inner pipe between those formations. Those formations also may help to centralise the inner pipe during its insertion into the outer pipe. Nevertheless, a gap preferably remains between the overbuilt formations and the interior of the outer pipe, to assist telescopic sliding movement of the inner pipe within the outer pipe upon assembly and to reduce thermal bridging across the annulus.

Modifying the architecture of the inner pipe in accordance with the invention by turning it into fully polymeric composite pipe greatly simplifies manufacture of the PiP structure. It also allows easier integration of additional functions, for example monitoring by fibre optics. In this respect, optical fibres can be embedded in or placed between any of the two or three abovementioned layers of the inner pipe, such fibres suitably being helically wound around the inner pipe.

As the inner pipe of the invention is lighter and more homogeneous relative to prior art such as Total SA's Energised Composite Solution (ECS), it can be thicker and stiffer. This means that spacers between the inner and outer pipes are no longer essential, which improves thermal insulation by avoiding thermal bridging between the inner and outer pipes.

As only the outer pipe of a PiP structure can be straightened to recover plastic deformation of that steel pipe after unspooling, it is advantageous if deformation of the inner pipe upon spooling is confined to the elastic domain. The composite structure of the inner pipe makes this possible.

The thermal insulation material used in PiP structures of the invention can be of any known type but is preferably a microporous or nanoporous material, with an exemplary pore size in the range of 10 to 200 microns, so that a vacuum can be drawn in the annulus to improve thermal performance. For example, the pressure in the annulus may be reduced to below 100 mbar. Examples of suitable thermal insulation materials are aerogels and flexible panels of pyrogenated silica as sold by Microtherm NV under the registered trade mark 'Izoflex'. The thermal insulation material is suitably also electrically insulating, thus having the beneficial side-effect of helping to isolate the inner pipe electrically.

As the composite inner pipe has a weight in air that is drastically lower than that of an equivalent steel pipe—being about 20% of the density of steel—the weight load applied by the inner pipe to an aligner and hence to the vertical or inclined laying tower of an installation vessel is greatly reduced. This allows the aligner and the laying tower to be less massive, thus enabling the vessel to be stable with a smaller hull. Compressive stress of the inner pipe near the sag bend due to self-weight of the inner pipe is also greatly reduced.

The inventive concept also embraces a method for manufacturing lightweight PiP structures for subsea transportation of fluids. Broadly, that method comprises:

providing an inner pipe, being a polymeric composite structure of bonded layers comprising a first, radially outer polymeric layer surrounding a second layer of composite material comprising reinforcing fibres embedded in a polymer matrix;

varying the thickness of the outer layer of the inner pipe along its length to produce longitudinally-spaced outwardly-protruding formations;

placing the inner pipe into a metal outer pipe to leave a thermally-isolating annulus between the inner and outer pipes; and providing thermally-insulating material around the inner pipe, wherein a gap is left in the annulus between the insulation material and the outer pipe.

For example, the method may involve fabricating or otherwise making an inner multi-layer composite pipe of at least two bonded layers, namely an outer electrically insulating polymeric tube disposed around a composite layer containing at least long or continuous carbon fibres embedded in a polymer matrix; and inserting the inner pipe into a metal outer pipe, which may be assembled by welding together successive steel pipes, to leave a thermally-isolating annulus between the inner and outer pipes.

The method may also involve wrapping at least one layer of thermally-insulating material around the inner pipe and then inserting the inner pipe wrapped with the thermally-insulating layer into the outer pipe. Alternatively a thermally-insulating material could be placed in the annulus after the inner pipe is inserted into the outer pipe, for example by injecting or pouring the material through an opening in the wall of the outer pipe.

A third bonded layer, suitably of pure polymer, may be provided as an inner layer of the inner pipe.

The inner pipe is preferably manufactured in a single section. For example, the inner pipe may be manufactured by co-extrusion involving simultaneous extrusion of two or more layers.

The local protruding formations may simplify wrapping of thermal insulation material and insertion of the inner pipe into the outer pipe. Thermal insulation material may be placed between longitudinally-spaced protruding formations.

After closing ends of the annulus, for example with bulkhead structures that join the inner and outer pipes, air may be pumped out of the annulus until pressure in the annulus is sufficiently low to achieve a desired level of thermal insulation.

In the foregoing description, mention has been made of rigid pipes. It is important to understand that in the lexicon of the subsea oil and gas industry, nominally 'rigid' pipes have enough flexibility to be bent along their length if a minimum bend radius (MBR) is observed. Yet, such pipes are not regarded in the industry as being 'flexible'.

Examples of rigid pipes used in the subsea oil and gas industry are specified in the American Petroleum Institute (API) Specification 5L and Recommended Practice 1111. A rigid pipe usually consists of or comprises at least one solid steel pipe, although rigid pipes of composite materials have recently been proposed. Additional components can be added to form a composite structure, such as an internal liner layer or an outer coating layer. Such additional components can comprise polymer, metal or composite materials. Rigid pipe joints of steel are typically terminated by a bevel or a thread, and are assembled end-to-end by welding or screwing them together.

The allowable in-service deflection of rigid steel pipe is determined by the elastic limit of steel, which is around 1% bending strain. Exceeding this limit causes plastic deformation of the steel. It follows that the MBR of rigid pipe used in the subsea oil and gas industry is typically around 100 to 300 meters depending upon the cross-sectional dimensions of the pipe. However, slight plastic deformation can be recovered or rectified by mechanical means, such as straightening. Thus, during reel-lay installation of a rigid pipeline made up of welded rigid pipe joints, the rigid pipeline can be spooled onto a reel with a typical radius of between 8 and 10 meters. This implies a bending strain around 2% for conventional diameters of rigid pipes, requiring the pipeline to be straightened mechanically upon unspooling.

Alternatively, flexible unbonded pipes used in the subsea oil and gas industry are specified in API Specification 17J and Recommended Practice 17B. The flexible pipe body is composed of a composite sandwich-wall structure of layered materials, in which each layer has its own function. Typically, polymer tubes and wraps ensure fluid-tightness and thermal insulation. Conversely, steel layers or other elements provide mechanical strength to resist tensile loads and hydrostatic pressure; for example, interlocked steel tapes form a carcass or pressure vault and a tensile armour is formed of helically-wound wire. Flexible pipes are terminated and assembled by end fittings. Unlike rigid pipelines that are assembled from multiple pipe joints, flexible pipelines are typically manufactured continuously to the desired length between their end fittings.

The structure of a flexible pipe allows a large bending deflection without a similarly large increase in bending stresses. The bending limit of the composite structure is determined by the elastic limit of the outermost plastics layer of the structure, typically the outer sheath, which limit is typically 6% to 7% bending strain. Exceeding that limit causes irreversible damage to the structure. Consequently, the MBR of flexible pipe used in the subsea oil and gas industry is typically between 3 and 6 meters.

The foregoing description also mentions both composite materials and composite structures. Those terms are not synonymous: there is an important distinction between them.

Composite materials (often shortened to 'composites') are materials made from two or more component materials with different but complementary properties. The composite nature of a composite material is intrinsic to that material itself. The component materials remain distinct from each other in the composite material but, when working together, the component materials confer characteristics on the composite material that are different from those of the individual component materials. An example of a composite material is a reinforced plastics material such as a fibre-reinforced polymer, being a combination of reinforcing fibres embedded in a matrix of polymer.

In contrast, composite structures are structures made of two or more components of different materials. The material of each component is chosen to perform the function of that component and to optimise the structure as a whole. Examples of composite structures used in the subsea oil and gas industry are a layered flexible pipe or a lined or coated rigid pipe, each of which typically comprises one or more components of carbon steel and one or more other components of different materials such as polymers or corrosion-resistant alloys. The composite structure may include one or more components made of composite materials, but not necessarily so. Thus, the composite nature of a composite structure is extrinsic to any of the materials from which the components of that structure are made.

Figure 2:
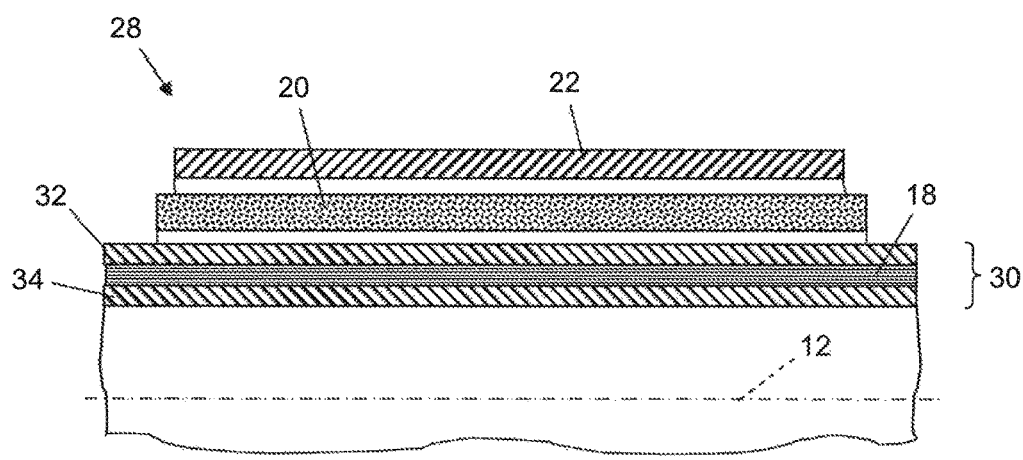
Figure 3:
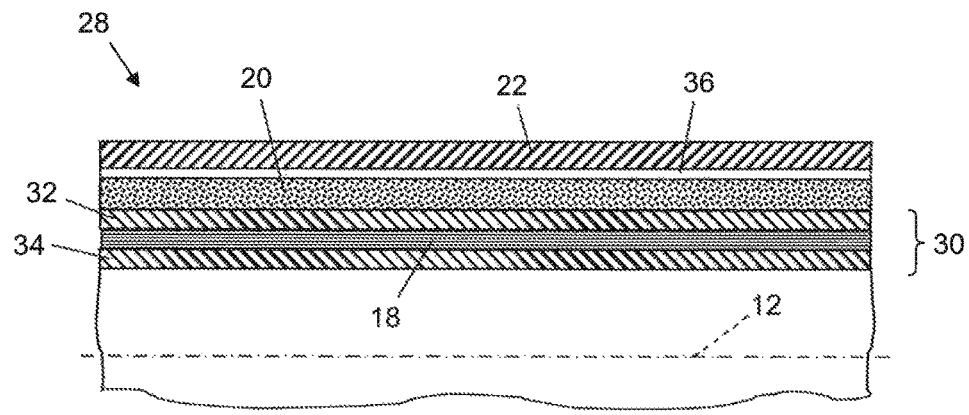
Figure 4:
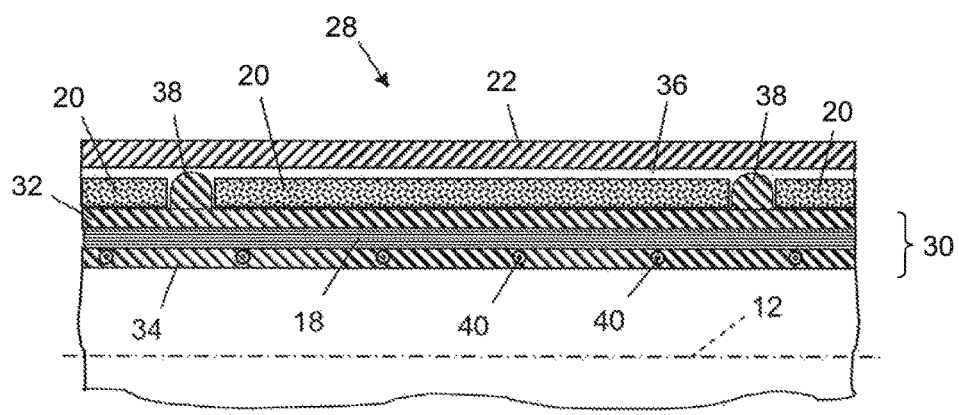
Figure 5:
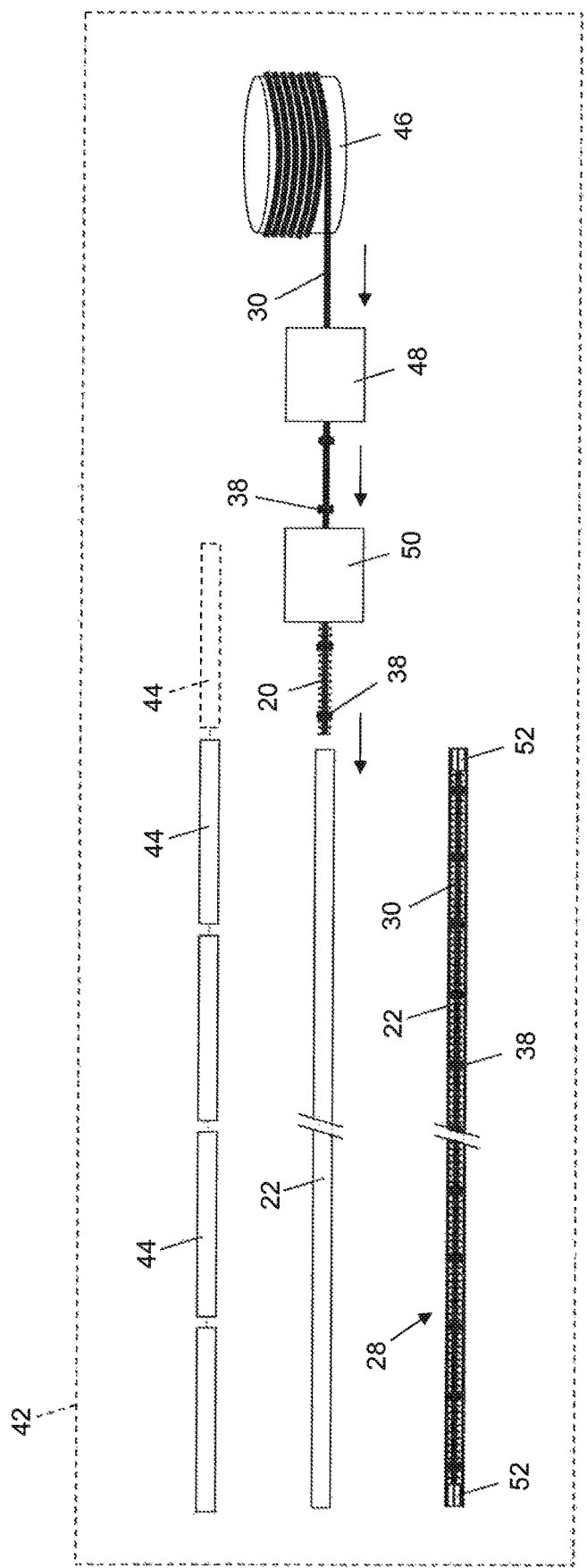

Reference has already been made to FIG. 1 of the appended drawings, which is a schematic exploded longitudinal sectional view of an electrically trace-heated PiP structure known in the prior art. In order that the invention may be more readily understood, reference will now be made, by way of example, to the remaining drawings in which:

FIG. 2 is a schematic exploded longitudinal sectional view of an electrically trace-heated PiP structure in accordance with the invention, including a layered bonded inner pipe having an optional inner layer;

FIG. 3 corresponds to FIG. 2 but in a non-exploded form;

FIG. 4 corresponds to FIG. 3 but shows a variant of the invention in which overbuilt formations project radially outwardly from an outer layer of the inner pipe; and FIG. 5 is a schematic diagram of a spoolbase performing a method of the invention to assemble a PiP structure of the invention.

In FIGS. 2 to 4, like numerals are used for like parts. In particular, a heating layer 18 being a composite of continuous carbon fibre in a polymer matrix, a layer of thermal insulation 20 and a metal outer pipe 22 are apparent in PiP structures 28 of the invention. The outer pipe 22 is of carbon steel and is conveniently assembled from steel pipe joints that are butt-welded end-to-end.

In each of FIGS. 2 to 4, the heating layer 18 is incorporated into an inner pipe 30, which is a composite structure of polymeric or polymer-based layers bonded together to form a solid pipe. The inner pipe 30 further comprises an electrically insulating outer layer 32 surrounding and bonded to the heating layer 18.

In this example, the inner pipe 30 also comprises an optional electrically-insulating inner layer 34 bonded on the radially inner side of the heating layer 18. The inner layer 34 presents a smooth inner surface that defines a flow path for the fluids carried by the PiP structure 28 in use.

The outer layer 32 and the optional inner layer 34 of the inner pipe 30 may be of non-reinforced polymer, which may be expressed as a pure polymer, or may comprise a polymer matrix reinforced by the addition of fibres such as glass fibres that are not electrically conductive.

In the heating layer 18 and preferably also in the other layers 32, 34 if they also contain reinforcement fibres, the reinforcement fibres are individually embedded in the polymer matrix to create a solid pipe wall that is impervious to gas even at high pressure. This is unlike a known composite pipe technology called Reinforced Thermoplastic Pipe or RTP, in which dry fibre reinforcements are wound around a liner as rovings. As the individual fibres of the rovings in RTP are not embedded in a matrix and so remain dry, the pipe wall of RTP is not truly solid. This means that gas can accumulate within the pipe wall, which makes RTP unsuitable for carrying fluids at high pressures. In contrast, the thickness, configuration and materials of the inner pipe 30 are preferably designed to withstand an internal fluid pressure of more than 100 bar, more preferably over 200 bar or even possibly over 300 bar, and an internal fluid temperature of more than 150° C.

The inner pipe 30 is advantageously manufactured as a single continuous integrated component. For example, the inner pipe 30 may be manufactured by co-extrusion, involving simultaneous extrusion of two or more of the layers 18, 32, 34. This has the further advantage over RTP that the inner pipe 30 can be made continuously to any desired length, such as 5,000 m to 10,000 m, whereas the length of an RTP component is limited to typically 400 m in view of limitations of its manufacturing process. This is too short for many subsea tie-backs if the inner pipe 30 is to be in one continuous piece.

The polymer materials of the layers 18, 32, 34 are preferably thermoplastics to allow melt-bonding at their interfaces to form an inner pipe 30 that is solid through its full wall thickness. The polymer materials of the layers 18, 32, 34 are preferably compatible for the purpose of bonding to each other and are more preferably identical. Examples of polymers that may be used in the inner pipe 30 are polyethylene (PE), polypropylene (PP), polyamide (PA), polyvinylidene difluoride (PVDF) and polyether ether ketone (PEEK).

As spacers 24 shown in FIG. 1 may preferably be omitted in PiP structures of the invention, the layer of thermal insulation 20 can extend continuously along the annulus between the inner pipe 30 and the outer pipe 22 as shown in the embodiment of FIGS. 2 and 3. Further to improve thermal management, a gap 36 is preferably left in the annulus between the insulation 20 and the outer pipe 22 as seen in FIG. 3.

FIG. 4 shows another PiP structure 28 of the invention. Here, protruding formations 38 are spaced longitudinally along the outside of the outer layer 32 of the inner pipe 30. The formations 38 extend circumferentially around the inner pipe 30 and protrude radially outwardly from the outer layer 32 to near the inside of the outer pipe 22. The formations 38 help to centralise the inner pipe 30 during its insertion into the outer pipe 22. To minimise friction or jamming during insertion and to reduce thermal bridging in use, the formations 38 taper outwardly to respective narrow apices, for example with the rounded or radiused section shown in FIG. 4. Also, the formations 38 remain spaced at their apices from the inside of the outer pipe 22.

The formations 38 can have any useful shape, for example a trapezoidal shape, an outwardly-tapered shape, a tooth shape or a rounded shape in axial, longitudinal cross-section.

The formations 38 are of pure or reinforced polymer, which is preferably compatible with or identical to the polymer of the outer layer 32. The formations 38 could be formed integrally with the outer layer 32 as the inner pipe 30 is manufactured. For example, an extrusion die forming the outer layer 32 in a co-extrusion process could be expanded and contracted radially at intervals to create the formations 38 as the inner pipe 30 advances during extrusion. Alternatively, the formations 38 could be bonded to or overmoulded on the outer layer 32 after the underlying layers of the inner pipe 30 are manufactured. For example, bonding may be achieved by fusing or by use of an adhesive.

In this example, the protruding formations 38 interrupt the layer of thermal insulation 20 in the annulus between the inner pipe 30 and the outer pipe 22. The formations 38 provide axial location for the insulation 20 to resist longitudinal slippage of the insulation 20 relative to the inner pipe 30.

FIG. 4 also shows optical fibres 40 that can be embedded in or placed between any of the layers 18, 32, 34 of the inner pipe 30 for monitoring or data-carrying purposes. Optical fibres 40 are suitably wound helically around the inner pipe 30 and so are seen here in cross-section.

FIG. 5 represents a coastal spoolbase 42 performing a method of the invention to assemble a PiP structure of the invention.

The PiP structure 28 of the invention is apt to be built onshore at the spoolbase 42 or at a yard in stalk assemblies of considerable length, which may for example be longer than 500 m and possibly 1000 m or more. The outer pipe 22 can be fabricated to the desired length by welding together a succession of pipe joints 44, either around the inner pipe 30 or, as shown in FIG. 5, as a prelude to telescopic insertion of the inner pipe 30 into the prefabricated outer pipe 22.

The inner pipe 30 can be brought to the spoolbase 42 either as an oversized continuous element that can be cut to a desired length at the spoolbase 42 or as a discrete element of predetermined length to suit the desired length of the finished PiP structure 28. FIG. 5 shows the first option. The inner pipe 30 is conveniently transported to the spoolbase 42 in a compact curved configuration, for example spooled onto a reel or carousel 46 as shown in FIG. 5.

Overbuilt protruding formations 38 of the required dimensions may be overmoulded or otherwise bonded onto the inner pipe 30 at the spoolbase 42, if they are not already part of the inner pipe 30 as manufactured. In this instance, after the inner pipe 30 is unspooled from the reel 46 at the spoolbase 42, the inner pipe 30 passes through an overmoulding station 48. There, protruding formations 38 are overmoulded onto the outer layer 32 of the inner pipe 30 at longitudinally-spaced intervals.

Next, the inner pipe 30 passes through an insulating station 50 at which a layer of insulating material 20 is wrapped around the inner pipe 30 between the longitudinally-spaced protruding formations 38. Thus insulated, the inner pipe 30 is inserted telescopically into the prefabricated outer pipe 22.

Finally, bulkheads 52 at each end of the PiP structure 28 join the respective ends of the outer and inner pipes 22, 30 to close the annulus between those pipes 22, 30. Air can then be pumped out of the annulus to draw down a partial vacuum if required.

The PiP structure 28 can be towed from the spoolbase 42 to an offshore installation location or spooled onto a reel of a pipelay vessel to be carried to an offshore installation location before unspooling and laying. The PiP structure 28 may be a stalk of a longer reel-lay pipeline, in which case it may be welded via the bulkheads 52 to one or more similar adjoining PiP structures 28 placed end-to-end. Structures such as towheads or accessories such as tees or termination structures can be welded to the end of the PiP structure 28 via a bulkhead 52.

Other variations are possible within the inventive concept. For example, thermally-insulating material could be placed in the annulus after the inner pipe 30 is inserted into the outer pipe 22, for example by injecting or pouring the material through an opening in the wall of the outer pipe 22.

Optical fibres 40 can be arranged in any alternative configuration known to the skilled person, such as in straight lines in the longitudinal direction or in a wave pattern. Also, the structure 28 may comprise discrete sensors embedded within or between any of the layers 18, 32, 34, an example of such a sensor being a Fibre Bragg Grating (FBG) reflector that is sensitive to temperature and/or to strain.

The heating layer 18 could be replaced with a corresponding composite layer in which the reinforcing fibres are not electrically heated. However, it is convenient and preferred that the reinforcing fibres of a heating layer 18 are used for heating PiP assemblies 28 of the invention.

The invention claimed is:

1. A rigid pipe-in-pipe structure for subsea transportation of fluids, comprising:
   inner and outer pipes in spaced concentric relation to define a thermally-isolating annulus between them; and
   thermal insulation material disposed in the annulus, wherein a gap is left in the annulus between the insulation material and the outer pipe;
   wherein the outer pipe is made of metal and the inner pipe is a polymeric composite structure of bonded layers comprising a first, radially outer polymeric layer surrounding a second layer of composite material comprising reinforcing fibres embedded in a polymer matrix, and
   wherein the thickness of the outer layer of the inner pipe varies along its length such that the inner pipe comprises a series of longitudinally-spaced formations formed integrally with the outer layer of the inner pipe and protruding radially outwardly from the outer layer.

2. The structure of claim 1, wherein the reinforcing fibres of the second layer comprise carbon fibres.

3. The structure of claim 2, wherein the second layer is a heating layer in which the carbon fibres are connected to an electrical power supply for resistant heating.

4. The structure of claim 1, wherein the inner pipe further comprises a third bonded layer being a radially inner polymeric layer within the second composite layer.

5. The structure of claim 1, wherein the polymers of the layers of the inner pipe are either all thermoset polymers or all thermoplastic polymers.

6. The structure of claim 5, wherein the polymers of all of the layers are structurally compatible polymers.

7. The structure of claim 1, wherein the polymer of one or more layers of the inner pipe serves as a matrix for reinforcing fibres that are electrically insulating.

8. The structure of claim 1, wherein abutting layers of the inner pipe are bonded to each other by fusing of thermoplastic polymers of those layers.

9. The structure of claim 1, wherein a gap remains between the protruding formations and the Interior of the outer pipe.

10. The structure of claim 1, further comprising at least one optical fibre embedded in or placed between one or more of the layers of the inner pipe.

11. The structure of claim 1, wherein the annulus is maintained without spacers between the inner and outer pipes.

12. The structure of claim 1, wherein the thermal insulation material is microporous or nanoporous.

13. The structure of claim 1, wherein the thermal insulation material is electrically insulating.

14. The structure of claim 1, wherein the annulus Is evacuated to a pressure of less than 100 mb.

15. A subsea installation comprising at least one pipe-in-pipe structure as defined in claim 1.

16. A method for manufacturing a rigid pipe-in-pipe structure for subsea transportation of fluids, the method comprising:
   providing an inner pipe, being a polymeric composite structure of bonded layers comprising a first, radially outer polymeric layer surrounding a second layer of composite material comprising reinforcing fibres embedded in a polymer matrix;
   varying the thickness of the outer layer of the inner pipe along its length to produce longitudinally-spaced outwardly-protruding formations;
   placing the inner pipe into a metal outer pipe to leave a thermally-isolating annulus between the inner and outer pipes; and
   providing thermally-insulating material around the inner pipe, wherein a gap is left in the annulus between the insulation material and the outer pipe.

17. The method of claim 16, comprising wrapping at least one layer of thermally insulating material around the inner pipe and then placing the inner pipe wrapped with the thermally-insulating layer into the outer pipe.

18. The method of claim 16, comprising placing a thermally-insulating material into the annulus after the inner pipe is placed into the outer pipe.

19. The method of claim 16, wherein the inner pipe is manufactured by co-extrusion involving simultaneous extrusion of two or more layers.

20. The method of claim 16, comprising fabricating the outer pipe to a desired length by welding together a succession of pipe joints.

21. The method of claim 16, comprising inserting the inner pipe telescopically into a prefabricated outer pipe.

22. The method of claim 16, comprising:
 transporting the inner pipe as an oversized element to an assembly location at which the pipe-in-pipe structure is assembled; and
 at the assembly location, cutting the inner pipe to a length suiting the structure.

23. The method of claim 16, comprising transporting the inner pipe as a made-to-length element to an assembly location at which the pipe-in-pipe structure is assembled.

24. A subsea installation comprising at least one pipe-in-pipe structure as made by the method of claim 16.

* * * * *